US006792816B2

(12) United States Patent
Totsu

(10) Patent No.: US 6,792,816 B2
(45) Date of Patent: Sep. 21, 2004

(54) BIT ADAPTER FOR TORQUE DETECTOR

(76) Inventor: Katsuyuki Totsu, 32-13, Oshiage 1-chome, Sumida-ku, Tokyo (JP), 131-0045

( * ) Notice: Subject to any disclaimer, the term of this patent is extended or adjusted under 35 U.S.C. 154(b) by 0 days.

(21) Appl. No.: 10/221,697

(22) PCT Filed: Mar. 15, 2001

(86) PCT No.: PCT/JP01/02032

§ 371 (c)(1), (2), (4) Date: Sep. 12, 2002

(87) PCT Pub. No.: WO01/71302

PCT Pub. Date: Sep. 27, 2001

(65) Prior Publication Data

US 2003/0037621 A1 Feb. 27, 2003

(30) Foreign Application Priority Data

Mar. 21, 2000 (JP) ....................................... 2000-077975

(51) Int. Cl.[7] ......................... B25B 23/14; B25B 13/00; B25B 21/00; G01L 5/24

(52) U.S. Cl. ......................................... 73/862.21; 81/52

(58) Field of Search ........................... 73/862.21, 862.7; 81/52, 475, 476

(56) References Cited

U.S. PATENT DOCUMENTS 3,942,337 A 3/1976 Leonard et al.
4,346,633 A * 8/1982 Rendl .......................... 81/475
4,964,319 A * 10/1990 Chang ........................ 81/58.3
4,977,708 A * 12/1990 Kloft .......................... 451/359
5,576,501 A 11/1996 Huang
5,722,805 A 3/1998 Giffin
5,813,298 A 9/1998 Beattie

FOREIGN PATENT DOCUMENTS

JP 63-4130 9/1981
JP 63-30568 2/1984
JP 5-43042 6/1993

* cited by examiner

*Primary Examiner*—Edward Lefkowitz
*Assistant Examiner*—Takisha Miller
(74) *Attorney, Agent, or Firm*—Jordan and Hamburg LLP

(57) ABSTRACT

A bit adapter for a torque detector enables torque measurement without requiring skill, is highly safe, and has a simple structure. In the bit adapter for torque detection, one end of a threaded shaft, which at the other end is provided with a locking part that detachably engages the output shaft, screws into a shaft pedestal with a screw hole, a flange part is provided on a part of the shaft, adjacently to the locking part, and a thrust bearing and a helical compression spring are interposed between this flange part and the aforesaid shaft pedestal, a shaft position control means that controls the position of the aforesaid shaft is provided by straddling the aforesaid shaft pedestal and a position slightly above the flange part.

10 Claims, 5 Drawing Sheets

(a)

(b)

BIT ADAPTER FOR TORQUE DETECTOR

BACKGROUND OF THE INVENTION

The present invention relates to a bit adapter for a torque detector that enables one to simply check and maintain torque accuracy by coupling a rotary fastening tool to the torque detector, in order to maintain the fastening (of screws, bolts, and the like) at a given torque value when using a rotary fastening tool (e.g., electric driver, air driver) in an assembly line for various industrial products, and the like.

Conventionally, it always has been important to tighten to a specific torque value when assembling various industrial products, and the like, and tightening screws, bolts, and the like, by using a rotary fastening tool (e.g., electric driver, air driver). As a result, for the aforesaid rotary fastening tool, in order to always maintain the tightening torque at the specified value, the reference torque value must be preset, and it is essential to utilize a torque control operation that allows the rotary fastening tool's torque to be adjusted by means of the appropriate torque detector.

Therefore, as the aforesaid rotary fastening tool's torque adjustment means, conventionally known devices are configured so that it is possible to set the tightening torque value with high precision, by combining a coil spring and a clutch mechanism, for example, and by then adjusting the compression state of this coil spring. That is, this type of torque adjustment means is configured based on the theory of determining the balance point between the coil spring's spring constant and the rotary fastening tool's turning force applied in the axial direction.

However, the inventor obtained Japanese Patent No. 1456555 (Japanese Patent Application Publication No. 63-4130), after developing, as a means of smoothly controlling the torque of the aforementioned rotary fastening tool, a device that is equipped with liquid-crystal display that allows the user to instantaneously digitally display and check the measured torque value of the rotary fastening tool, and that is equipped with a torque detector configured so as to enable the detection of the torque value set in the aforesaid rotary fastening tool, via a bit adapter (i.e., rotational inertia force damper) consisting of a coupling means for transmitting the rotary tightening force by coupling the driver bit of the rotary fastening tool.

The invention of the aforesaid patent is characterized in that one end of a threaded shaft screws, in a freely adjustable state, into a shaft pedestal with a screw hole; a locking part that detachably engages the output shaft of the rotary fastening tool is provided at the other end of the aforesaid shaft; a flange part is provided on a part of the aforesaid shaft, adjacently to the aforesaid locking part; a thrust bearing and a coil spring are interposed between this flange part and the aforesaid shaft pedestal; thereby configuring a bit adapter (i.e., rotational inertia force damper) that functions as a means of damping the rotational inertia force of the output shaft of the aforesaid rotary fastening tool.

FIGS. 6 and 7 show the general configuration of the aforementioned conventional bit adapter (i.e., rotational inertia force damper). In FIGS. 6 and 7, the bit adapter 10 is composed basically of a shaft pedestal 13 with a screw hole equipped integrally with a square step 12 that fits tightly into the special opening-shaped part formed in the bit coupling 22 provided in the torque detector 20; the threaded shaft 14 configured such that one end screws, in a freely movable state, into the screw hole 13*a* provided in the center of this pedestal 13; the helical compression spring 15 that is disposed by inserting it concentrically around this shaft 14 so as to enclose it; and the flange part 16 that is positioned opposite the pedestal 13, relative to the aforesaid shaft 14, and that, together with the aforesaid pedestal 13, tightly holds the aforesaid helical compression spring 15.

At the other end of the aforesaid shaft 14 is provided the locking part 14*a* that has a chuckable shape formed at the end of aforesaid bit, and so forth, like the detachably coupled driver bit, and so forth, relative to the tip of the output shaft 24 of a rotary fastening tool (e.g., an electric driver, an air driver, another nut setter), which is the measurement target. The bearing holder 17, which is formed so as to enclose the aforesaid flange part 16, is disposed relative to the shaft 14 formed in this manner. That is, this bearing holder 17 fits with play around the aforesaid shaft 14; it and the aforesaid flange part 16 encloses and holds appropriately the washer 18 and the thrust bearing 19; and it is disposed so as to abut and freely slide against the aforesaid flange part 16. This is configured so that the helical compression spring 15, which is inserted so as to enclose the aforesaid shaft 14, is resiliently pressure-contacted and held at both ends, between the aforesaid bearing holder 17 and the aforesaid pedestal 13 (see FIG. 7).

Measurement preparations are completed for the bit adapter 10 configured thus by engaging the locking part 14*a* of the shaft 14 in the output shaft 24 of the rotary fastening tool, which is the measurement target, and by then tightly fitting the square step 12 formed integrally in the shaft pedestal 13 into the bit coupling 22 of the torque detector 20 (see FIG. 6).

Next, when the rotary fastening tool is activated, the output shaft 24 and the shaft 14 rotate, and one end of the shaft 14 screws into the screw hole 13*a* provided in the center of the pedestal 13. In this manner, the helical compression spring 15 is compressed axially between the bearing holder 17 and the pedestal 13, and when it reaches its compression limit, which corresponds to the strength of the rotational torque exerted on the shaft 14, the shaft 14 loses its ability to screw further into the screw hole 13*a* of the pedestal 13.

In this manner, while the rotational torque obtained at the output shaft 24 of the aforesaid rotary fastening tool is transmitted, via the bit adapter 10, to the detection part (not shown) of the torque detector 20, the rotational inertia force is absorbed by the plastic deformation resulting from the elastic force of the helical compression spring 15, so it is possible to transmit only the net rotational torque. As a result, at the detection part of the torque detector 20, the rotational inertia force that accumulated in the output shaft 24 of the rotary fastening tool is absorbed and relaxed by the elastic force of the helical compression spring 15, so it is possible to reproduce a state similar to that during an actual rotary fastening operation and to measure the accurate torque value corresponding only to the net rotational torque.

However, the conventional bit adapter for a torque detector configured as aforementioned has the following problems, among others, that must be solved: During preparations to measure the set torque value in order to fasten the screw, and the like, of a rotary fastening tool, the work required to couple the tip of the output shaft 24 of the rotary fastening tool to the aforesaid bit adapter for a torque detector 10 and then to tightly fit this into the bit coupling 22 of the torque detector 20 is somewhat cumbersome and requires operator skill.

Also, during the torque value measurement operation in the aforementioned conventional bit adapter for a torque detector, in order to forcibly screw the threaded shaft 14 into the screw hole 13*a* of the shaft pedestal 13 in opposition to the elastic force of the helical compression spring 15, excessive stress is exerted on the aforesaid shaft 14, so there is a risk of instantaneous breakage of the shaft 14 as the result of numerous operations.

SUMMARY OF THE INVENTION

So, after assiduously researching and studying the problems of the aforesaid conventional bit adapters for a torque detector, the inventor ascertained that it is possible to simply and rapidly accomplish, without any particular experience, the work up to the completion of torque value measurement, by providing a means of controlling the position of the aforesaid shaft (i.e., a shaft position control means), that straddles the aforesaid pedestal and a position slightly above the flange part of the threaded shaft, when the threaded shaft is screwed into the screw hole of the shaft pedestal through the helical compression spring, and by setting it so that the movement of the top of the aforesaid shaft is restrained, thereby coupling this with the output shaft of the rotary fastening tool and tightly fitting it to the bit coupling of the torque detector.

The inventor also ascertained that, by providing the aforementioned shaft position control means, when the shaft breaks during a torque value measurement operation, the aforesaid shaft position control means can be used to control the position of the broken shaft, and it is possible to prevent the flying off of the helical compression spring inserted around the aforesaid shaft, so it is possible to obtain a bit adapter for a torque detector that simplifies handling and adequately assures operational safety.

Consequently, the purpose of the present invention is to provide a bit adapter for a torque detector that enables measurement of the torque value corresponding only to the appropriate rotational torque, by detachably coupling the shaft to the aforesaid output shaft and by absorbing and relaxing the rotational inertia force accumulated in this output shaft, when measuring the appropriate torque value of a rotary fastening tool after coupling the output shaft of the rotary fastening tool to the bit coupling of the torque detector; and that, by providing a means of controlling the position of the shaft coupled to the aforesaid output shaft, enables—without requiring any particular skill—the simple and rapid accomplishment of operations from the coupling of this with the rotary fastening tools' output shaft and the tight fitting of this to the torque detector's bit coupling, to the completion of the measurement of the torque value; that enables adequate assurance of operational safety, even after the shaft breaks during operation; and that enables production of a device with a simple structure and a low cost.

In order to achieve the aforesaid objectives, the bit adapter for a torque detector of the present invention is characterized in that it provides a shaft position control means that controls the position of the aforesaid shaft, by straddling the aforesaid shaft pedestal and a position slightly above the flange part of the threaded shaft, in a bit adapter for a torque detector configured such that, when the output shaft of a rotary fastening tool is coupled with the bit coupling of the torque detector, one end of a threaded shaft, which at the other end is provided with a locking part that detachably engages the aforesaid output shaft, screws, in a freely adjustable state, into a shaft pedestal with a screw hole; a flange part is provided on a part of the aforesaid shaft, adjacently to the aforesaid locking part; a thrust bearing and a helical compression spring are interposed between this flange part and the aforesaid shaft pedestal; and the rotational inertia force of the aforesaid output shaft is absorbed and relaxed; thereby enabling measurement of the torque value corresponding only to the appropriate rotary torque.

In this case, the aforesaid shaft position control means extends along the outer surfaces of the helical compression spring and the flange holder into which the shaft was inserted and disposed, and it can be composed of a support plate-type enclosure with sides formed into a three-sided rectangle, so that one end is fixed to the shaft pedestal and the shaft passes through the other end.

Also, the aforesaid shaft position control means extends bisymmetrically along the outer surfaces of the helical compression spring and the flange holder into which the shaft was inserted and disposed; and it can be composed of bisymmetrical, support plate-type enclosures, so that one end is fixed to the shaft pedestal and the shaft passes through the other end.

Furthermore, the aforesaid shaft position control means can be configured such that it encloses the periphery of the helical compression spring and the flange holder into which the shaft was inserted and disposed; such that it can be composed of a cylindrical enclosure formed so that one end is fixed to the shaft pedestal and the shaft passes through the other end; and such that a monitoring window is provided in one side of the aforesaid cylindrical enclosure.

BRIEF EXPLANATION OF THE DRAWINGS

FIG. 3(*b*) is the rear view of the bit adaptor of FIG. 1.

FIG. 3(*c*) is the top view of the bit adaptor of FIG. 1.

FIG. 3(*d*) is the bottom view of the bit adaptor of FIG. 1.

FIG. 5(*b*) is the side view of a partial cross-section of the bit adaptor of FIG. 5(*a*).

Explanation of Reference Numbers

Figure 1:
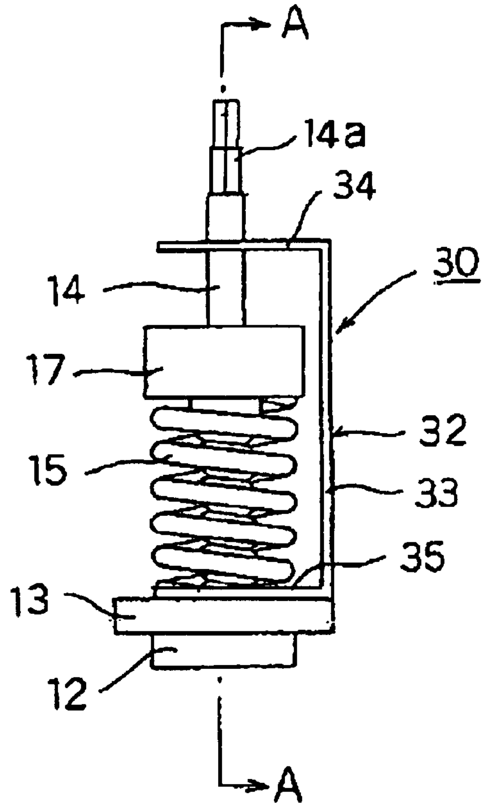
FIG. 1 is the side view of the principal parts, showing one embodiment of the bit adapter for a torque detector of the present invention.

30 Bit adapter
12 Square step
13 Shaft pedestal
13*a* Screw hole
14 Threaded shaft
14*a* Locking part
15 Helical compression spring
16 Flange part
17 Bearing holder
18 Washer
19 Thrust bearing

20 Torque detector
22 Bit coupling
24 Output shaft
32, 32A, 32B Shaft position control means
33 External parallel shroud
34 Top shroud
34*a* Shaft through-hole
35 Bottom shroud
36 Cylindrical enclosure
37 Shaft through-hole
38 Mating screw part
39 Monitoring window

DETAILED DESCRIPTION OF THE PREFERRED EMBODIMENT

Next, embodiments of the bit adaptor for torque detection of the present invention will be explained in detail, with reference to the appended drawings.

Embodiment 1

Figure 2:
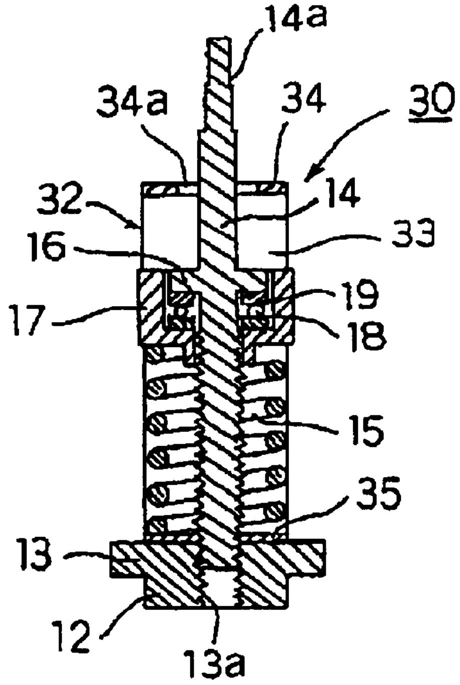
FIG. 2 is the cross-section, along line A—A, of the bit adapter for a torque detector shown in FIG. 1.
Figure 3:
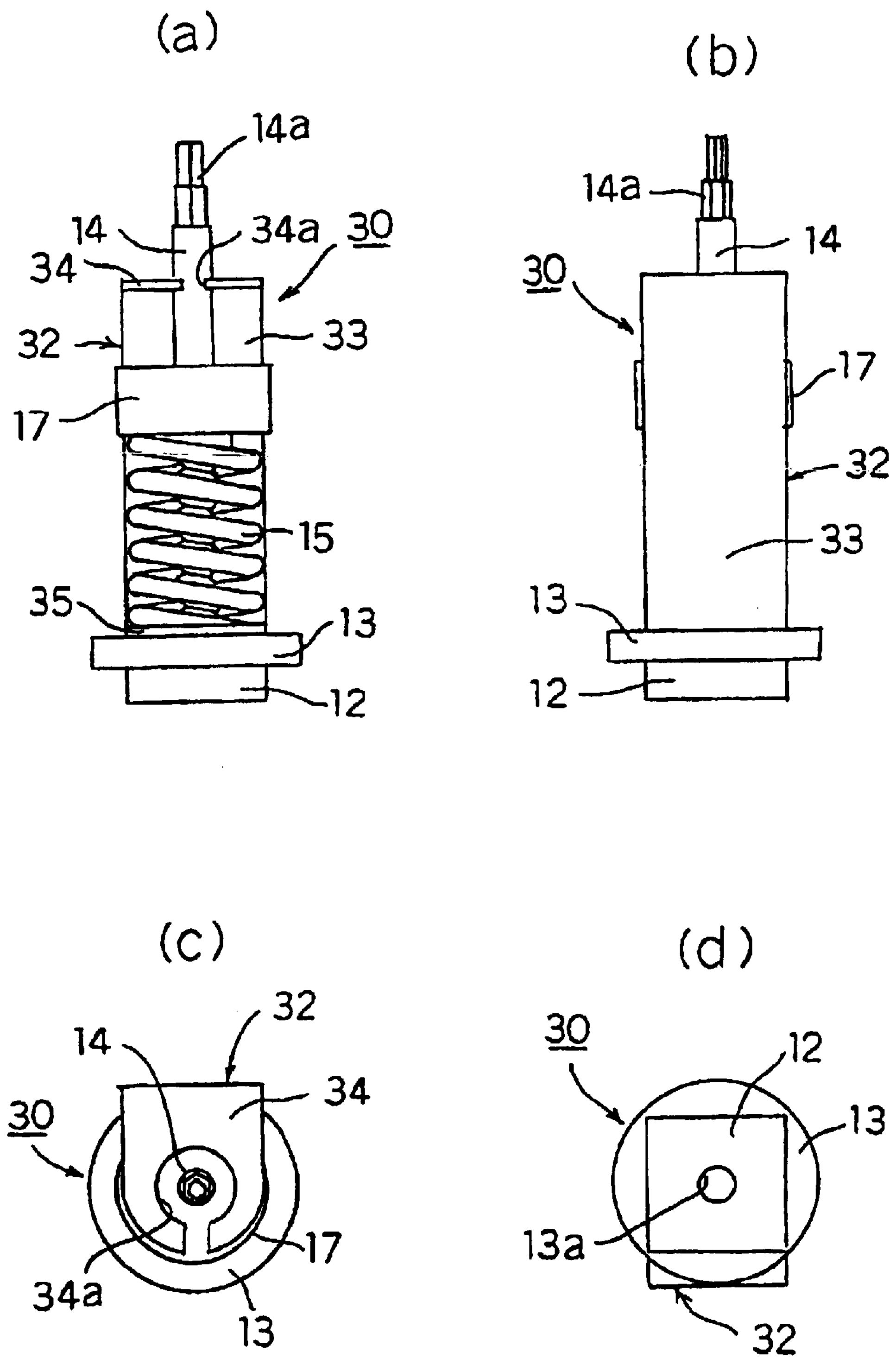
FIG. 3(*a*) is the front view of the bit adapter for a torque detector shown in FIG. 1.
Figure 6:
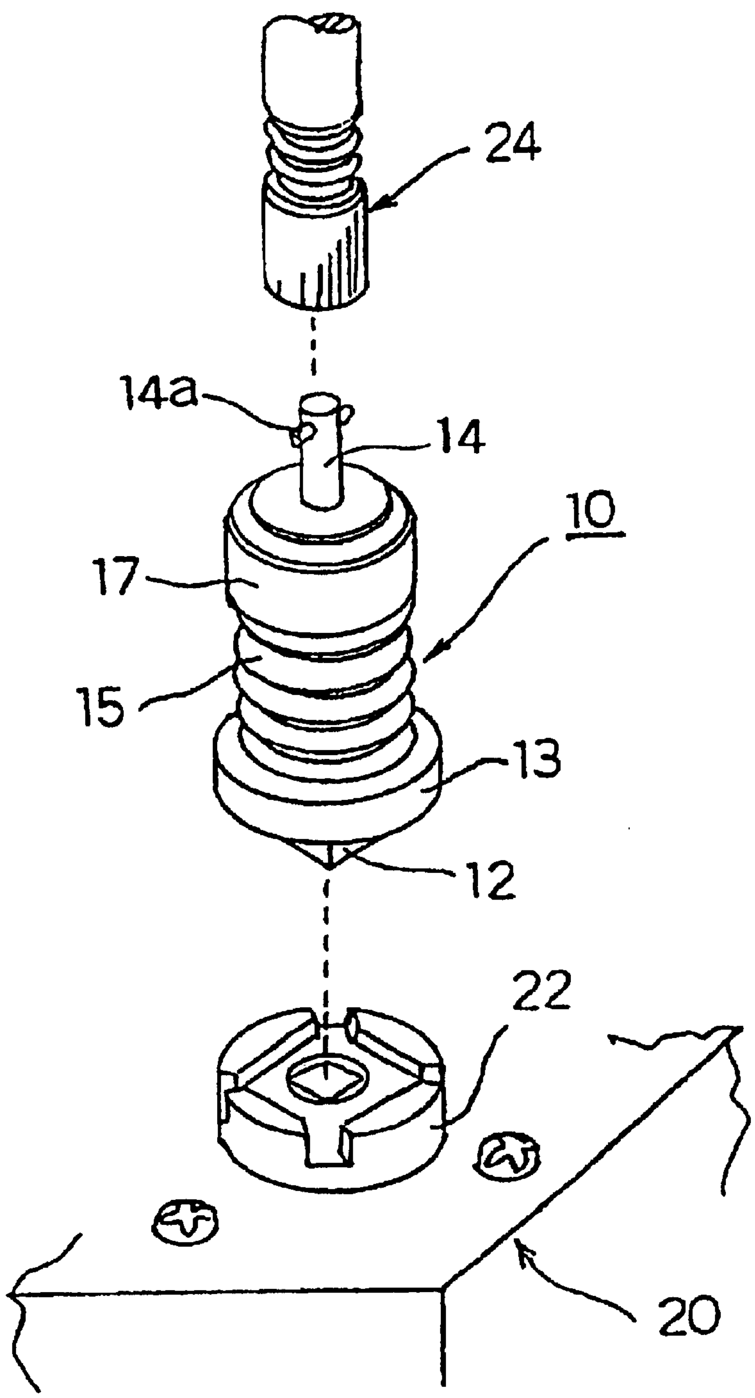
F I G. 6 (Prior Art)
FIG. 6 is a cross-sectional side view of the principal parts, showing the general structure of a conventional bit adapter for a torque detector.
Figure 7:
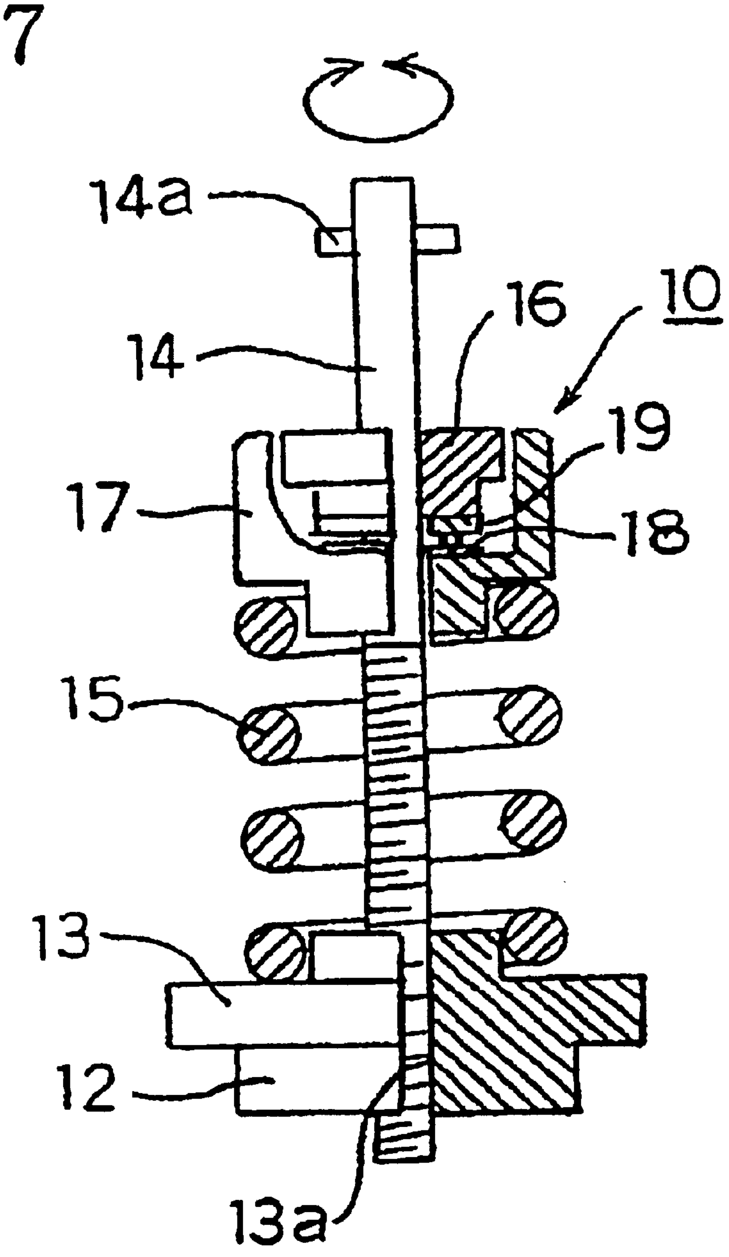
F I G. 7 (Prior Art)
FIG. 7 is a general illustration showing the usage state of the bit adapter for a torque detector of FIG. 6.

FIGS. 1 through 3 show one embodiment of the bit adapter 30 for a torque detector of the present invention. Furthermore, to facilitate explanation, the same reference symbols are applied to structural elements identical to those of the conventional bit adapter for a torque detector 10 shown in FIGS. 6 and 7.

That is, in FIGS. 1 through 3, the basic configuration of the bit adapter 30 of the present embodiment is identical to that of the aforesaid conventional bit adapter 10, said basic configuration consisting of the shaft pedestal 13 with a screw hole equipped integrally with a square step 12 that fits tightly into the special opening-shaped part formed in the bit coupling 22 (see FIG. 6) provided in the torque detector 20 (see FIG. 6); the threaded shaft 14 configured such that one end screws, in a freely movable state, into the screw hole 13*a* provided in the center of this pedestal 13; the helical compression spring 15 that is disposed by inserting it concentrically around this shaft 14 so as to enclose it; and the flange part 16 that is positioned opposite the pedestal 13, relative to the aforesaid shaft 14, and that, together with the aforesaid pedestal 13, tightly holds the aforesaid helical compression spring 15.

At the other end of the aforesaid shaft 14 is provided the locking part 14*a* that has a chuckable shape formed at the end of aforesaid bit, and so forth, like the detachably coupled driver bit, and so forth, relative to the tip the output shaft 24 (see FIG. 6) of a rotary fastening tool (e.g., an electric driver, an air driver, another nut setter), which is the measurement target. The bearing holder 17, which is formed so as to enclose the aforesaid flange part 16, is disposed relative to the shaft 14 formed in this manner. That is, this bearing holder 17 fits with play around the aforesaid shaft 14; it and the aforesaid flange part 16 enclose and hold appropriately the washer 18 and the thrust bearing 19; and it is disposed so as to abut and freely slide against the aforesaid flange part 16. This is configured so that the helical compression spring 15, which is inserted so as to enclose the aforesaid shaft 14, is resiliently pressure-contacted and held at both ends between the aforesaid bearing holder 17 and the aforesaid pedestal 13 (see FIG. 2). This configuration is identical to that of the aforesaid conventional bit adapter 10.

Consequently, the bit adapter 30 of the present embodiment is configured so as to provide a shaft position control means 32 that controls the position of the aforesaid shaft 14, by straddling the aforesaid shaft pedestal 13 and a position slightly above the flange part 16 of the threaded shaft 14.

In the present embodiment, in FIGS. 1 through 3, the aforesaid shaft position control means 32 is a support plate-type enclosure that is disposed along the periphery of the helical compression spring 15 and the bearing holder 17 disposed around the aforesaid shaft 14, and that has a side formed into a three-sided rectangle; and it is composed of the external parallel shroud 33, the top shroud 34 formed by bending one end at a right angle, and the bottom shroud 35 formed by bending the other end at a right angle. Also, the shaft through-hole 34*a* is provided in the aforesaid top shroud 34, so that the shaft 14 passes through freely, and the bottom shroud 35 is fixed so that the threaded part of the aforesaid shaft 14 can pass through the shaft pedestal 13.

According to the bit adapter 30 of the present embodiment, which is configured thus, the aforesaid shaft position control means 32 controls, with respect to the shaft pedestal 13, the positions (i.e., the coupling state) of the shaft 14 and the helical compression spring 15, so when measuring, via this bit adapter 30, the set torque value for tightening the screw, and so forth, of a rotary fastening tool, it is possible to simply and rapidly accomplish, without requiring particular training, the operations from the coupling the tip of the output shaft 24 of a rotary fastening tool to the aforesaid bit adapter for a torque detector 10 and the tight fitting of this to the bit coupling 22 of the torque detector 20, to the completion of the measurement of the torque value.

When the shaft 14 breaks during a torque value measurement operation, the aforesaid shaft position control means 32 can be used to control the position of the broken shaft 14, and it is possible to prevent the flying off of the helical compression spring 15 inserted around the aforesaid shaft, so it is possible to simplify handling and adequately assure operational safety.

Embodiment 2

Figure 4:
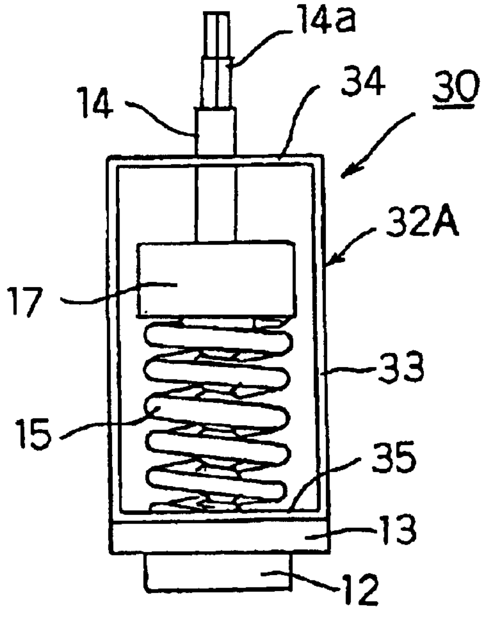
FIG. 4 is the side view of the principal parts, showing a modified example of the bit adapter for a torque detector.

FIG. 4 shows a modified example of the bit adapter for a torque detector of the present invention, which is shown in the aforesaid Embodiment 1. Furthermore, in FIG. 4, to facilitate explanation, the same reference symbols are applied to the structural parts identical to those of Embodiment 1, which are shown in the aforementioned FIGS. 1 through 3, so the detailed explanation is omitted.

That is, the present embodiment is configured such that the external parallel shrouds 33 of a support plate-type enclosure with sides formed into a three-sided rectangle are provided bisymmetrically as the shaft position control means 32A, in the shaft position control means 32 of the aforesaid Embodiment 1 shown in FIG. 1. Other configurations are identical to that of the aforesaid Embodiment 1. Consequently, the bit adapter 30 of the present Embodiment 2 yields the following advantages: It is possible to obtain functionality and effects identical to those of the bit adapter 30 of the aforesaid Embodiment 1, and it particularly is possible to stabilize strength-wise, compared with the bit adapter 30 of Embodiment 1.

Embodiment 3

Figure 5:
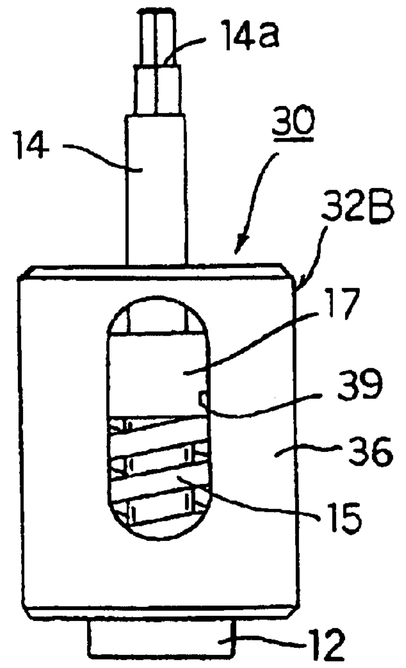
FIG. 5(*a*) is the side view of the principal parts, showing another embodiment of the bit adapter for a torque detector of the present invention.
Figure 5:
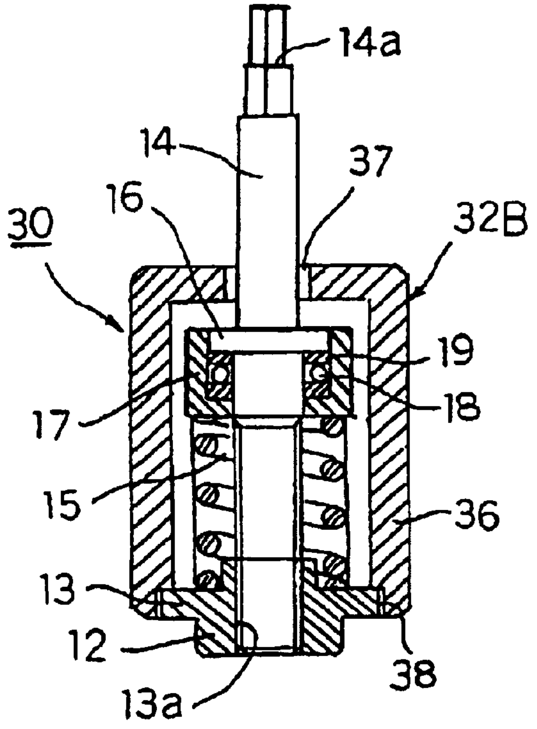

FIGS. 5(*a*) and (*b*) show another embodiment of the bit adapter for a torque detector of the present invention. Furthermore, in FIGS. 5(*a*) and (*b*), to facilitate explanation, the same reference symbols are applied to structural elements identical to those of Embodiment 1 shown in the aforesaid FIGS. 1 through 3, so the detailed explanation is omitted.

That is, the present embodiment is characterized in that the shaft position control means 32B is configured as cylindrical enclosure 36. That is, this cylindrical enclosure 36 is disposed so as to cylindrically enclose the periphery of the helical compression spring 15 and the bearing holder 17 through which the shaft 14 passes and is disposed.

The aforesaid cylindrical enclosure 36 is provided at its top with a shaft through-hole 37, at its bottom with mating screw part 38 for mating in the shaft pedestal 13, and on one side with a monitoring window 39 that allows the user to monitor the interior of the aforesaid enclosure 36 (i.e., the states of the bearing holder 17 and the helical compression spring 15).

Also in the bit adapter 30 of the present Embodiment 3 configured thus, it is possible to obtain functionality identical to that of the bit adapter 30 of aforementioned Embodiment 1 and Embodiment 2.

Each of the preferred embodiments of the present invention was explained previously. However, the present invention is not limited by the aforesaid embodiments, so many design modifications are possible as long as they do not depart from the spirit of the present invention.

As is evident from the aforementioned embodiments, the bit adapter for a torque detector of the present invention has many outstanding advantages:

In a bit adapter for a torque detector configured such that, when the output shaft of a rotary fastening tool is coupled with the bit coupling of the torque detector, one end of a threaded shaft, which at the other end is provided with a locking part that detachably engages the aforesaid output shaft, screws, in a freely adjustable state, into a shaft pedestal with a screw hole; a flange part is provided on a part of the aforesaid shaft, adjacently to the aforesaid locking part; a thrust bearing and a helical compression spring are interposed between this flange part and the aforesaid shaft pedestal; the rotational inertia force of the aforesaid output shaft is absorbed and relaxed, thereby enabling measurement of the torque value that responded only to the appropriate rotary torque, by configuring so as to provide a shaft position control means that controls the position of the aforesaid shaft by spanning the aforesaid shaft pedestal and a position slightly above the flange part of the threaded shaft, it is possible to simply and rapidly accomplish, without requiring special training, operations from the coupling of the output shaft of the rotary fastening tool to this bit adapter for a torque detector and the tight fitting of this to the bit coupling of the torque detector, to the completion of the measurement of the torque value; it is possible to adequately assure operational safety, even after the shaft breaks during operation; it is possible to produce a device with a simple structure and a low cost; etc.

What is claimed is:

1. A bit adapter for a torque detector, comprising:

a shaft pedestal including an integrally formed square step that closely engages with a bit coupling part provided on a torque detector, said shaft pedestal having a centrally located screw hole therein;

a threaded shaft configured such that a first end thereof engages in a retractable manner with said screw hole, and such that a second end thereof couples with an output shaft of a rotary fastening device;

a helical compression spring enclosing said threaded shaft in which the threaded shaft is inserted and disposed concentrically;

a flange part disposed opposite said pedestal relative to said threaded shaft and elastically sandwiching said helical compression spring with said shaft pedestal;

a bearing holder that fits with play with said threaded shaft and, with said flange part, encloses and holds said threaded shaft and said flange part via a thrust bearing and is disposed to abut the flange part in a freely slidable manner; and shaft positioning means for controlling the position of said shaft disposed to extend from said shaft pedestal to a position between a distal end of said helical compression spring and said second end of said threaded shaft so as to straddle said helical compression spring, said threaded shaft being inserted and disposed through opposed ends of said shaft positioning means, said shaft positioning means including a support plate enclosure member in a shape of a three-sided rectangle and having a side surface extending laterally along an exterior of said helical compression spring and said bearing holder into which said threaded shaft is inserted and disposed, one side of said shaft positioning means being fixed on said shaft pedestal and said threaded shaft passing through an other end thereof.

2. A bit adapter for a torque detector, comprising:

a shaft pedestal including an integrally formed square step that closely engages with a bit coupling part provided on a torque detector, said shaft pedestal having a centrally located screw hole therein;

a threaded shaft configured such that a first end thereof engages in a retractable manner with said screw hole, and such that a second end thereof couples with an output shaft of a rotary fastening device;

a helical compression spring enclosing said threaded shaft in which the threaded shaft is inserted and disposed concentrically;

a flange part disposed opposite said pedestal relative to said threaded shaft and elastically sandwiching said helical compression spring with said shaft pedestal;

a bearing holder that fits with play with said threaded shaft and, with said flange part, encloses and holds said threaded shaft and said flange part via a thrust bearing and is disposed to abut the flange part in a freely slidable manner; and shaft positioning means for controlling the position of said shaft disposed to extend from said shaft pedestal to a position between a distal end of said helical compression spring and said second end of said threaded shaft so as to straddle said helical compression spring, said threaded shaft being inserted and disposed through opposed ends of said shaft positioning means, said shaft positioning means including a bilaterally symmetrical support plate shaped enclosure member formed so as to extend along a exterior of said helical compression spring and said bearing holder into which said threaded shaft is inserted and disposed, one side of said shaft positioning means being fixed on said shaft pedestal and said threaded shaft passing through an other end thereof.

3. A bit adapter for a torque detector, comprising:

a shaft pedestal including an integrally formed square step that closely engages with a bit coupling part provided on a torque detector, said shaft pedestal having a centrally located screw hole therein;

a threaded shaft configured such that a first end thereof engages in a retractable manner with said screw hole, and such that a second end thereof couples with an output shaft of a rotary fastening device;

a helical compression spring enclosing said threaded shaft in which the threaded shaft is inserted and disposed concentrically;

a flange part disposed opposite said pedestal relative to said threaded shaft and elastically sandwiching said helical compression spring with said shaft pedestal;

a bearing holder that fits with play with said threaded shaft and, with said flange part, encloses and holds said threaded shaft and said flange part via a thrust bearing and is disposed to abut the flange part in a freely slidable manner; and shaft positioning means for controlling the position of said shaft disposed to extend from said shaft pedestal to a position between a distal end of said helical compression spring and said second end of said threaded shaft so as to straddle said helical compression spring, said threaded shaft being inserted and disposed through opposed ends of said shaft positioning means, said shaft positioning means including a cylindrical enclosure member formed so as to enclose an exterior of said helical compression spring and said bearing holder into which said threaded shaft is inserted and disposed, one side of said shaft positioning means being fixed on said shaft pedestal and said threaded shaft passing through an other end thereof, a monitoring window being provided on a side of said cylindrical enclosure.

4. A bit adapter through which an output shaft of a rotary fastening tool can be coupled to a bit coupling part of a torque detector to allow torque accuracy of the rotary fastening tool to be a checked by the torque detector, the bit adapter comprising:

a shaft pedestal including a coupling portion correspondingly configured to engage the bit coupling part of the torque detector in a manner preventing relative rotation between the shaft pedestal and the coupling part, said shaft pedestal having a centrally located screw hole therein having internal threads;

a threaded shaft having external threads matching said internal threads of the screw hole such that a first end of the threaded shaft engages in a retractable manner with the internal threads of said screw hole, a second end of said threaded shaft being configured to couple with an output shaft of a rotary fastening device in a manner preventing relative rotation therebetween, said threaded shaft having a flange part carried thereon in an axial position of said shaft located between said first and second ends;

a helical compression spring being disposed coaxially about said threaded shaft, said helical compression spring being captively held between said flange part and said shaft pedestal, said helical spring being compressible by movement of said flange part in a direction of said shaft pedestal brought about by rotation of said threaded shaft in threaded engagement with said shaft pedestal; and shaft position control means for controlling relative positioning of the threaded shaft and the helical spring with respect to the shaft pedestal, said shaft position control means straddling said shaft pedestal and a position located between the flange part of the threaded shaft and said second end thereof.

5. A bit adapter according to claim 4, further comprising:

a thrust bearing disposed to abut the flange part in a freely slidable manner; and a bearing holder that fits with play with said threaded shaft and, with said flange part, encloses and guides said threaded shaft.

6. A bit adapter according to claim 4, wherein shaft position control means is comprised of a support plate enclosure with sides formed as a three-sided rectangle, an end of said support plate corresponding to a first side of said three-sided rectangle being fixed to the shaft pedestal with the threaded shaft passing through an opposite end of the support corresponding to a third side of the three-sided rectangle, said end and said opposite end of said support plate being interconnected by a structural portion corresponding to a second side of the three-sided rectangle and extending laterally along outer surfaces of the helical compression spring and the flange part.

7. The bit adapter for a torque detector of claim 4, wherein said shaft position control means includes a support plate enclosure having bilaterally symmetrical structure, a portion of which extends along outer surfaces of the helical compression spring and the flange part, said support plate enclosure being formed such that one end of said support plate enclosure is fixed to the shaft pedestal and such that the threaded shaft passes through an other end of said support plate enclosure.

8. The bit adapter for a torque detector of claim 4, wherein said said shaft position control means includes a tubular enclosure formed such that one end thereof is fixed to the shaft pedestal and such that the shaft passes through an other end of the tubular enclosure, said tubular enclosure enclosing a periphery of the helical compression spring and the flange part.

9. The bit adapter according to claim 8, wherein said tubular enclosure is generally cylindrical in shape.

10. The bit adapter according to claim 8, wherein a monitoring window is provided on a side of said tubular enclosure.

* * * * *